United States Patent Office 3,427,129
Patented Feb. 11, 1969

3,427,129
PROCESS FOR PREPARING ORTHO-
PHOSPHOROUS ACID
Riyad R. Irani and Robert S. Mitchell, St. Louis, Mo., assignors to Monsanto Company, St. Louis, Mo., a corporation of Delaware
No Drawing. Filed Sept. 12, 1966, Ser. No. 578,464
U.S. Cl. 23—165
Int. Cl. C01b 25/16
9 Claims

ABSTRACT OF THE DISCLOSURE

Phosphorous acid is produced by the following reaction at from 70°–200° C.

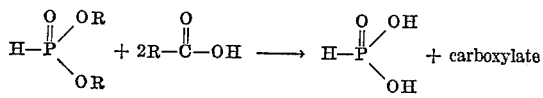

This invention, in general, relates to a process for preparing orthophosphorous acid and, more particularly, relates to a process for preparing substantially anydrous orthophosphorous acid.

Orthophosphorous acid is usually prepared by the hydrolysis of $PCl_3$ with water. Several methods are known for this hydrolysis but such are, in general, difficult to carry out and are not considered to be satisfactory for a number of reasons. For example, some of the hydrolysis methods result in substantial decomposition of the desired orthophosphorous acid and/or excessive loss of $PCl_3$ by volatilization. Perhaps even more importantly, such methods are not considered to be satisfactory when a substantially anhydrous orthophosphorous acid is desired. As is well known there are numerous problems associated with preparing a substantially anhydrous orthophosphorous acid from a dilute aqueous solution by concentrating such acid using heat since orthophosphorous acid is unstable at a relatively low temperature. As can be appreciated, therefore, a process for preparing substantially anhydrous orthophosphorous acid in relatively high yields would represent an advancement in this art.

It is an object of this invention to provide a process for preparing orthophosphorous acid.

It is a further object of this invention to provide a process for preparing substantially anhydrous orthophosphorous acid in good yields.

It is a still further object of this invention to provide a process for preparing substantially anhydrous orthophosphorous acid in a continuous manner.

These and other objects will become apparent from a reading of the following detailed description.

It has now been found that orthophosphorous acid can be prepared advantageously by reacting a di-organo phosphite and a mono-carboxylic acid at a temperature below about 200° C. and separating the carboxylate by-product from the resulting orthophosphorous acid as will be more fully discussed hereinafter.

The following is the reaction in equation form:

(I)

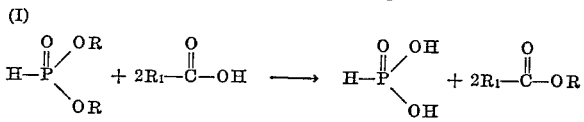

wherein each R is selected from the group consisting of lower alkyl (1–6 carbon atoms), phenyl, tolyl and xylyl and $R_1$ is selected from the group consisting of lower alkyl groups (1–6 carbon atoms) and phenyl. It is preferred that both A and $R_1$ be either methyl or ethyl groups.

Typical di-organo phosphites which are suitable for use in the process include dimethyl phosphite, diethyl phosphite, dipropyl phosphite, dibutyl phosphite, ethyl propyl phosphite, methyl ethyl phosphite, dihexyl phosphite, methyl pentyl phosphite, methyl phenyl phosphite, diphenyl phosphite, ditolyl phosphite, dixylyl phosphite, ethyl tolyl phosphite, and the like.

Typical mono-carboxylic acids which are suitable for use in the process include acetic acid, propionic acid, isobutyric acid, ethyl methyl acetic acid, benzoic acid, n-butyric acid, n-valeric acid, 2,3-dimethyl butanoic acid, 2-ethyl-1-butanoic acid, 2-methylpentanoic acid and the like.

As previously mentioned, the carboxylate by-product should be separated from the resulting orthophosphorous acid and such can be accomplished by many and various methods. Such methods include the use of a diluent capable of forming an azeotrope with the by-product carboxylate and removing such by distillation or the use of a selective extractant or solvent for the by-product carboxylate. It is preferred, however to remove the by-product carboxylate as it is formed such as by maintaining the temperature of the reaction in excess of the boiling point of the by-product carboxylate in order to permit its evolution as a gas. Thus, when using the preferred reactants such as dimethyl phosphite or diethyl phosphite and acetic acid or propionic acid the reaction is preferably carried out at temperatures above the boiling point of the by-product carboxylate, i.e., methyl acetate, ethyl acetate and the like.

The process is temperature dependent to the extent that above about 200° C. the yield is extremely low and essentially only degraded products of orthophosphorous acid are obtained (under atmospheric pressure, although sub-atmospheric pressures as well as pressures in excess of atmospheric can be used). Also, the process becomes slow, as judged by the rate of by-product carboxylate evolved, while operating below about 70° C. and therefore it is preferred that the operating temperature range is from about 70° C. to about 180° C. However, temperatures may be used below about 70° C. if longer reaction times can be tolerated.

As noted by the Equation I above, the reactions are used stoichiometrically in a mole ratio of 2:1 (carboxylic acid:phosphite), although excess of either reactant is not necessarily detrimental. Moreover, the order of addition of the reactants does not appear critical although it is preferable to add the phosphite to the carboxylic acid. The reactants can be simply mixed together or blended under suitable temperature conditions to prepare the desired orthophosphorous acid. If desired, an inert non-aqueous liquid solvent can be used as a reaction medium such as paraffins (hexane, heptane and the like) aromatics (benzene, toluene and the like), ethers, esters and the like, although it is preferred that an excess of carboxylic acid reactant be used in the reaction (up to about 100% in excess) and this also enables its use as a reaction medium. The excess carboxylic acid reactant can usually be readily distilled off from the orthophosphorous acid.

Ordinarily the desired reaction will be fairly complete, under optimum reaction conditions, in a short time, for example, 4 hours or less, although there may be cases in which certain reaction conditions are used which may require as much as 10 hours or even longer for the reaction. On the average, however, and under optimum reaction conditions, generally from about 1 hour to about 5 hours is required in order to prepare orthophosphorous acid in high yields.

The reaction can be carried out by many and varied methods. For example, in a batch process, the reactants can be charged to a suitable reaction vessel and reacted under reaction conditions as specified herein. The mono-carboxylic acid reactant can be charged to a suitable reaction vessel and the di-organo phosphite reactant added either continuously or intermittently to the vessel. Or, in some cases, if desired, the di-organo phosphite reactant can be added through a plurality of feed lines to the mono-carboxylic acid reactant. Included, also, is a batch process in which the reactants are added either continuously or intermittently through either a single feed line or a plurality of feed lines to the reaction vessel.

A distinct advantage of the process of the present invention is that it can be adapted, if desired, to a continuous process for preparing orthophosphorous acid, particularly substantially anhydrous orthophosphorous acid. For example, a mono-carboxylic acid reactant is continuously fed into a suitable reaction vessel and the rate of addition of the di-organo phosphite is controlled with the temperature and other reaction conditions to insure the continuous withdrawal of the desired product. More particularly, the temperature of the reactants can be maintained at a value below the boiling point of the mono-carboxylic acid reactant but above the boiling point of the by-product carboxylate. Thus, the by-product carboxylate is continuously distilled off and, if desired, can be hydrolyzed by known methods to the mono-carboxylic acid for reuse or recycle to the reaction vessel. Example reactants for such a continuous process are dimethyl phosphite and acetic acid since methyl acetate boils at a much lower temperature than acetic acid.

The following examples are presented to illustrate the invention with parts by weight being used in the examples unless otherwise indicated.

EXAMPLE I

Into a flask equipped with a reflux condenser are charged about 110 parts of dimethyl phosphite and about 180 parts of acetic acid and heated to a reflux temperature of about 130° C. Over a period of about 3 hours the reflux temperature steadily diminishes to about 78° C. as the excess acetic acid and by-product methyl acetate distills off. Analyses of the product (N.M.R.) indicate about 100% anhydrous orthophosphorous acid.

EXAMPLE II

In the same manner as in Example I, above, about 234 parts of diphenyl phosphite and about 180 parts of acetic acid are heated to a temperature of about 130° C. for about 3 hours to yield orthophosphorous acid.

EXAMPLE III

In the same manner as in Example I, above, about 262 parts of ditolyl phosphite and about 222 parts of propionic acid were heated at a temperature of about 170° C. for a period of about 4 hours to yield orthophosphorous acid.

EXAMPLE IV

In the same manner as in Example I, above, about 290 parts of dixylyl phosphite and about 324 parts of 2-ethyl-1-butanoic acid are reacted at a temperature of about 150° C. for about 3 hours to yield orthophosphorous acid.

EXAMPLE V

In the same manner as in Example I, above, about 110 parts of dimethyl phosphite and about 342 parts of benzoic acid are reacted together at about 110° C. for about 5 hours to yield orthophosphorous acid.

What is claimed is:

1. A process for preparing orthophosphorous acid which comprises reacting a di-organo phosphite having the formula:

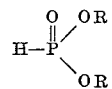

wherein each R is selected from the group consisting of lower alkyl, phenyl, tolyl and xylyl, with a mono-carboxylic acid having the formula:

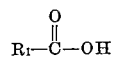

wherein $R_1$ is selected from the group consisting of lower alkyl and phenyl at a temperature below about 200° C. whereby orthophosphorous acid and by-product carboxylate is formed and separating said by-product carboxylate and said orthophosphorous acid.

2. A process according to claim 1, wherein said temperature is from about 70° C. to about 200° C.

3. A process according to claim 2, wherein the orthophosphorous acid formed is substantially anhydrous orthophosphorous acid.

4. A process according to claim 3, wherein said di-organophosphite is dimethyl phosphite and said mono-carboxylic acid is acetic acid.

5. A process according to claim 4, wherein said process steps are carried out in a continuous manner.

6. A process according to claim 3, wherein said di-organophosphite is diethyl phosphite and said mono-carboxylic acid is acetic acid.

7. A process according to claim 6, wherein said process steps are carried out in a continuous manner.

8. A process according to claim 4, wherein said by-product carboxylate is removed from the reaction zone as it is formed.

9. A process according to claim 6, wherein said by-product carboxylate is removed from the reaction zone as it is formed.

References Cited

Bailar, Edit.; Inorganic Synthesis, vol. IV (1953), p. 58.

OSCAR R. VERTIZ, *Primary Examiner.*

A. J. GREIF, *Assistant Examiner.*

U.S. Cl. X.R.

260—983